E. R. HOLDEN.
APPARATUS FOR TREATING ORES.
APPLICATION FILED JULY 21, 1915.

1,179,313.  Patented Apr. 11, 1916.

Attest:
O. Mitchie

Inventor:
E. R. Holden
by Oscar F. Gunz, his Atty.

UNITED STATES PATENT OFFICE.

EDWARD R. HOLDEN, OF LOS ANGELES, CALIFORNIA.

APPARATUS FOR TREATING ORES.

1,179,313.   Specification of Letters Patent.   Patented Apr. 11, 1916.

Application filed July 21, 1915. Serial No. 41,045.

*To all whom it may concern:*

Be it known that I, EDWARD R. HOLDEN, a citizen of the United States, and a resident of Los Angeles, in the county of Los Angeles and State of California, have invented certain new and useful Improvements in Apparatus for Treating Ores, of which the following is a specification.

This invention relates to an improved apparatus for treating ores.

The object of my invention is to provide a new and improved apparatus for treating ore containing gold, silver and other metals, with cyanid or other solvent solutions, which apparatus is simple in construction and is capable of saving large quantities of gold, silver, copper and their compounds, that in the present practice of hydrometallurgy is now wasted in tailings.

Figure 1:
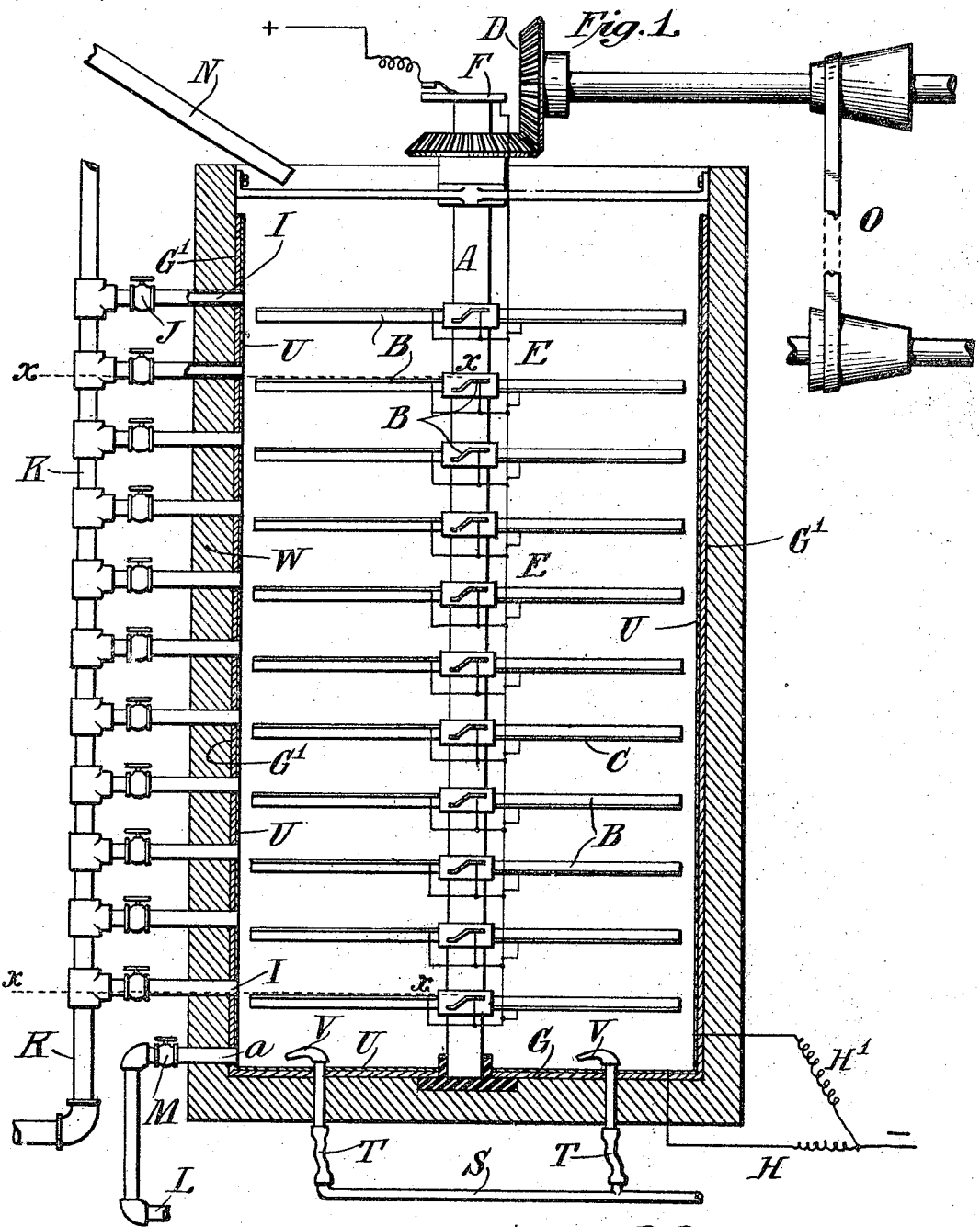
Figure 2:
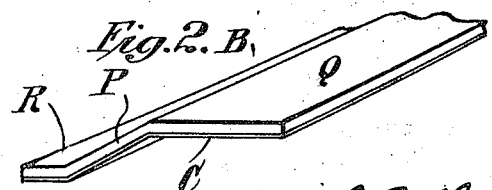

In the accompanying drawings: Figure 1 is a diagrammatic view of one embodiment of my apparatus for treating ore. Fig. 2 is a perspective view of one of the blades.

W in Fig. 1 is a tank made of any suitable material, preferably wood, and should be constructed about twelve feet high and from six feet to eight feet in diameter, although other sizes may be found advantageous. In this tank a vertical central shaft A is mounted, said shaft being constructed of any material not affected by the presence of dissolving solutions, and throughout its entire height is provided with radial wooden blades B or blades of any other suitable material, and being located about one foot apart vertically and having the underside covered with peroxidized sheets of lead C.

The said shaft is rotated by gearing D or other suitable appliance. Running downward and attached to said shaft is an electric conducting lead wire E which is connected with the sheet lead coverings C on all of the blades, the whole being charged with a positive current of electricity through a metallic disk F located on the top of said shaft, the lead sheets C thereby constituting the anode. The said tank is provided with a copper or other metallic cathode plate G covering the bottom as well as a separate cathode G' completely lining the inside of the tank. The said cathode plate as well as the cathode lining are in connection with a negative current of electricity as shown by wires in contact at H, H'. Both of the cathode surfaces are coated with mercury U for the purpose of absorbing metallic gold and silver, either as it occurs in the ore in the metallic state, or as it is precipitated out of the solution as will be hereafter more fully described.

The tank is provided with a series of equidistant openings or holes I located one above the other, the holes being one foot apart, more or less, beginning at the bottom of the tank and extending upward to within one foot of the top. Each of these holes or openings in the side of the tank, except the lowest one, are controlled by valves J, each of which, when opened, would allow all the ore and solution in the tank above that opening, to be drawn off separately and consecutively from the top downward, and escape into the drawoff pipe K, which is connected with all of the openings, except the bottom one. The pipe K leads to settling tanks, not shown. The last opening $a$ at the bottom of the tank is connected with a drawoff pipe L, having a valve M, and the mixture of concentrates and solution drawn from this bottom opening is carried by the pipe L into separate settling tanks not shown. The launder N carries the finely pulverized ore from the crushing machinery direct into the tank.

For the regulation and variation of the speed and the rotation of the vertical central shaft A and the blades attached, a set of cone pulleys O, or other suitable mechanical means, are so arranged as to revolve the shaft to any exact desired number of revolutions per minute, for the important purposes as will appear hereinafter.

P in Fig. 2 indicates the pitch of the blades, which should be about 30 degrees. Q represents the horizontal extension on the upper portion of the blades. R represents the lower part of the blade with an extended horizontal short pointed extension; the construction of the blades being entirely uniform in width. The peculiar form of this blade and its action while in motion will be fully explained below.

S in Fig. 1 represents an air pipe having two connections passing through the bottom of the tank and having elbows inside the tank, into which nozzles V are set with small openings for the purpose of introducing air under pressure and the openings of the nozzles being set to point in the same direction as the moving body of solution. T represents rubber tubes attached to the air pipe S and connected with the short pipes entering the bottom of the tank, the rubber connections being for the purpose of preventing electric contact with the pipe S. The air being introduced for the well known purpose of assisting in the oxidizing of basic compounds contained in the ore.

The operation is as follows: The pulverized ore and solvent solution is run into the tank until the same is filled, all the valves J and M being closed. The shaft A with blades attached is then set in motion and rotated at a speed sufficient to cause the smallest and lightest particles of ore and mineralized matter in the tank, to rise in the solution and find their equilibrium in the uppermost stratum or layer through the circuitous velocity of the solution, produced by the revolving blades. The next larger and heavier particles of ore and mineralized matter will form the next lower stratum of moving ore in the solution and through the maintained velocities, during the operation, it will be found that all of the ore and mineralized matter, will be in different strata, according to their volume and specific gravity, the speed being so regulated throughout each operation as to cause the largest particles of silica to be elevated from the bottom stratum into the stratum just above. The speed is then maintained without variation, for the necessary period to allow the solvent solution, for example, cyanid solution, to dissolve all of the gold and silver and other metals that are amenable to the solvent.

I find that from three to six hours is ample in which to circumgyrate the solution and finely divided ore, to cause all the finer particles of metallic gold and silver and the compounds of these metals to be acted upon by the solvent. While the chemical action of dissolution is progressing, an electric current of sufficient strength is simultaneously conducted through the mass of ore and solution, by means of the anode, formed of the lead blades, and the cathode formed of the copper bottom and lining.

I found that by having a large area of anode surface, attached to revolving blades operating in a conducting solution in a tank and distributed throughout the solution from the bottom to the top of the tank, together with a suitable area of cathode surface, that the current is completely and thoroughly disseminated through the entire solution and thereby the electric precipitation of the metals from the solution is more fully and quickly performed. Through the circumferential velocity of the moving body of ore and solution, all metallic particles of gold and silver as well as ions of electrolytically precipitated metallic particles are forced to the inner circumference of the tank against the cathode surface, not only by the negative cathode attraction for positive metallic ions, but by the centrifugal force imparted to these metallic substances, owing to their specific gravities being established by the molecular alteration from a soluble compound of gold and silver into the metallic condition. The entire cathode surface of the tank being amalgamated with mercury, the absorption of the particles of gold and silver, originally in the ore in metallic form, as well as the gold and silver precipitated out of the solution electrolytically, is at once absorbed and amalgamated by the coating of mercury on the cathode lining on the inside, as well as the bottom of the tank. By this centrifugal action the smaller particles of metallic gold and silver are constantly pressed and forced with considerable pressure against the mercury coated cathode lining of the tank and are amalgamated, and the larger particles of these metals, through their gravity, are amalgamated on the cathode at the bottom of the tank.

The blades attached to each separate hub can be of any desired number, but I find that four serve all the purposes required, and the action of the blades, while in operation in the tank is as follows:—Each set of blades are attached to the shaft in such a position that the horizontal extension Q, as shown in Fig. 2, is on a line with the bottom of each opening. There is one set of blades just below each opening, excepting the lowermost opening, as illustrated by the dotted line x shown in Fig. 1, there being eleven sets of blades in the tank described as twelve feet high inside.

The horizontal blades are so disposed that their horizontal surface Q is practically on the same plane with the bottom edge of the nearest opening I so that there will be one set of blades horizontally disposed at the bottom of each opening and consequently between each two openings there will be one series of such horizontal blades. With this arrangement it will be seen that while the blades agitate the liquid in rotating, there will be a space between the blades in which the particles of ore, gangue and so forth can be held in equilibrium.

Tanks of more or less depth or with more or less openings, can, of course, be used without departing from the spirit of my invention. A regulated constant revolving velocity being imparted to the blades, the entire mass of ore in the tank begins to ascend until the various ore particles rotate in equilibrium in the solution, according to their volume and specific gravity, due to the regulated velocity imparted. The revolution of the blades set at an angle of about 30 degrees serves to maintain the different strata after their equilibrium has been established and the extension Q of the blades, which operates in a circuitous horizontal plane, assists in preventing any of the particles of ore from falling back or downward. When in motion, each set of blades assists in maintaining the stratum formed in the space just above and their being an equidistant space between each set of blades, of about nine inches, all the ore and mineralized matter is kept in position through gravity, by the circumferential velocity during the operation, and until they are ready to be drawn off one by one from the top downward, as will hereinafter be fully described.

If the ore and solution is rotated at a certain uniform speed so as to impart a circumgyratory motion to the solution, the ore material will separate into various strata according to the size and gravity of the particles and the velocity used. The heaviest material will be in the lower part of the tank, and toward the top it will gradually diminish both in size and gravity.

The speed of rotation of the blades depends upon the fineness to which the ore and mineralized matter have been crushed, for example, if the material was not ground very fine, the rotation will have to be comparatively rapid, in order to produce a separation into different strata of the particles of material having different specific gravities and sizes, while if the material was ground very fine, the rotation need not be so rapid, to establish the different strata. Of course the finer the material the more soluble the gold, silver and other metals or compounds become and furthermore, all of the metals and metallic compounds contained in the ore that escaped fine crushing, and not dissolved, and not amenable to the solvent solution, will be found in the lowest stratum, in the bottom of the tank, that is, below the lowest outlet or opening I.

When the apparatus has been in operation for say six hours, all the chemically combined gold and silver, as well as the finer particles of metallic gold and silver in the strata above the lowest,—in the present case the eleven upper strata,—will be practically dissolved and precipitated on the mercurized cathode surfaces, and the tailings as they are removed stratum by stratum consecutively, show by assay that the gangue removed from the eleven upper strata are uniformally without value in gold and silver, but as stated, the lowest stratum containing undissolved gold and silver and other metals and mineralized material will be found very valuable.

The motion, speed or velocity of the revolving body of solution and ore, must not be altered at any time while discharging each stratum through its separate opening. When the operation of the process is finished, let us say after six hours, and the solution and ore is to be discharged, it will not do to remove the upper eleven strata simultaneously, as that would disturb the equilibrium of every stratum at one and the same time, and would cause such a commotion as would also destroy the equilibrium of the lower stratum, and therefore, cause a mixture of the lower stratum with some of the strata that were being discharged, and interfere with the deposit or concentration of the gold and silver and mineral compounds in the bottom stratum of the bank. For the successful operation, it is necessary to draw off each stratum beginning at the top, before the next one below is disturbed.

We now open the top or uppermost valve J and when the upper stratum has been drawn off, we next open the second valve J and when that stratum has been discharged, the third valve is opened and so on down to, but not including the lowermost or last stratum, which is about one foot deep in the bottom of the tank. This last stratum is then drawn off by itself through the opening $a$ and pipe L by opening valve M and conducted into a separate settling tank (not shown) for the undissolved metallic and concentrated mineral product exclusively. All of the other strata above the lowest one, having been diverted into one large settling tank (not shown) are allowed to settle for the purpose of drawing off, or decanting the solvent solution, to be pumped into the stock tanks for further use, and the tailings are then consigned to the waste dump.

The lower stratum, which was drawn off into a separate settling tank, by the method and mechanism described, and which consists of undissolved mineral compounds, metallic particles of gold and silver and other metals, are then reground and passed through the same operation again or treated by any other method such as smelting, for the recovery of the gold, silver or other metals.

I am aware of the fact that there are many devices for which patents have been issued for the simple concentration of ores, whereby a rotary or other motion is used to cause the lighter particles of ore to rise in a revolving or moving body of water, and the lighter particles allowed to continuously overflow out of one or more spouts, allowing the heavier particles to concentrate on the bottom to be thereafter removed, but I am not aware of any device or process having ever been used or patented, whereby the different sizes of ore, having different specific gravities, are separated into different strata and confined in a tank and rotated in bulk and kept in that stratified position in a solvent solution, until all the gold, silver and metallic contents, amenable to the solvent are dissolved and precipitated electrolytically in contact with a cathode covered with mercury and the remaining parts of the gangue from which the metallic contents were extracted, removed from the tank, stratum after stratum downward from the top, and retaining the undissolved and heavier particles of gold, silver and other metals and the compounds of these metals in the bottom of the tank, thereby performing the several actions of dissolution of the precious metals and their precipitation on mercurized cathodes, through the agency of electrolysis and concentration at one and the same time, of all metals and mineral compounds not amenable to the solvent used.

I am also aware of the fact that there are many devices for which patents have been granted for agitating ore in tanks containing a solvent solution, the object being, in all cases, to keep the ore in suspension, surrounded by the dissolving solution, until all of the gold, silver or other metals or compounds of metals that were amenable to the solvents are dissolved, when the entire mass in bulk is then removed from the tank, either by first allowing the ore to settle in the said tank and decanting and washing out the clear solvent liquor containing the dissolved metals, or second, by passing the entire contents of the tank through filter presses to separate the liquor from the remaining ore, in both instances, however, consigning the entire ore in bulk to the waste dump as tailings. I am not, however, aware of any process or device or tank having ever been used or patented, whereby in the treatment of ores the various particles of gold, silver or other metals, or the compounds of such metals amenable to the solvents, have been dissolved, precipitated and recovered, while in the same operation the gold, silver and other metals, or the compounds of metals, not amenable to the solvents used, have been retained or concentrated and recovered simultaneously in the said tank, and only the gangue from which the metals were dissolved allowed to escape, stratum by stratum, consecutively through separate openings, while the body of ore and solution is kept in a circumgyratory or any other action and the metal or mineral compounds from which the metals were not dissolved, retained in the lower stratum and not mixed in the general mass of tailings discarded.

The essence of this invention rests in the fact that I have discovered, that by the special construction and manipulated operation of the tank described, I am enabled to segregate in the bottom of the tank, and thereby recover valuable metallic and mineral compounds, that have heretofore been mixed up in the discarded mass of ore constituting the wasted tailings.

In all present agitating methods of treating ore, the waste tailings emptied in bulk from any agitating tank, now in use, may show by assay, merely as an illustration, .03 oz. per ton in gold at $20.00 per oz., the value of 60 cents per ton, and 3. oz. of silver at 60 cents per oz., the value of $1.80 per ton, or a total average value of $2.40 per ton; due to the fact that the present agitating dissolving tank is not constructed to save mechanically any of the larger particles of metallic gold, silver or other metals that frequently occur in ores, owing to the great length of time required to dissolve particles of such sizes. Nor can the said tanks save any concentrates of mineralized matter or the compounds of gold, silver or other metals, or cause a mechanical separation of any part of the ore contents and are only efficient and operated for dissolving purposes. I found that the cause of the largest part of the above illustrated loss of $2.40 per ton, in the tailings, was due to the lack of device, control and facilities in the present form of agitating or dissolving tanks, for the separation of those parts of the mineral contents that were not amenable to the solvent solution. In other words, the practice in all mills at present using the agitating method for dissolving precious or other metals, is to obtain the best dissolution of the amenable metals present and consign to the waste dump the entire ore product from which they were extracted.

For the purpose of illustrating this new method of saving the maximum amount of gold, silver and valuable mineral compounds, in ores of an oxidized or refractory nature, I set forth below the operation from actual results obtained from the treatment of one ton of low grade semioxidized ore, taken from a mine located in Arizona, and treated in an apparatus such as herein shown and described, the solvent used being potassium cyanid of the strength of 0.25% the consumption being 1.5 lbs. per ton of ore:

Weight 1 ton, assay of raw ore in gold 0.20 oz. value at $20 per oz .................................................. $4.00
Weight 1 ton, assay of raw ore in silver 3.00 oz. value at 50¢ per oz .................................................. 1.50

Total value .............................................. $5.50

After an operation of six hours:

Wasted as tailings 1800 lbs., consisting of 11 top strata................ {Assay in gold per ton 0.002 oz. value per ton........... 0.04¢
Assay in silver per ton 0.070 value per ton........... 0.035¢}
0.075¢

Recovered 200 lbs., consisting of 12th or bottom stratum.................. {Assay in gold per ton 0.38 oz. value per ton of concentrates......... $7.60
Assay in silver per ton 5.00 oz. value per ton of concentrates......... 2.50}

$10.10

It will be observed that the extraction obtained from the eleven top strata, shows 99% of the gold and 97.66% of the silver.

It will also be observed, that if the entire contents of the tank, consisting of the twelve strata, were discarded as tailings,— as in the present mill practice—that the tailings would then have assayed .0389 oz. gold per ton and .563 oz. silver per ton and the extractions obtained would only have been as follows: 80.1% of the gold and 81.2% of the silver, or a loss in the operation, as compared with the results obtained in my tanks of 18.9% in gold and 16.46% in silver; the saving in favor of my tank amounting to 76¢ worth of gold and 25¢ worth of silver, or a total of $1.01 per ton of ore.

It can also be noted that the saving, above enumerated, consisted solely in the recovery of the 200 lbs. of mineralized matter or concentrates, in which the gold and silver and other metallic compounds were not wholly dissolved by the solvent used. This 200 lbs. of concentrates is exclusive of the mercury, into which the dissolved gold and silver was precipitated electrolytically; which mercury contains all of the gold and silver extracted except the usual amount remaining in solution, which amounts to about 25 cents per ton of liquid, and after settling, is pumped back into the stock solution tanks, to be continually used over again.

It being well known that through the agency of an electric current, gold, silver and other metals that are dissolved in the presence of any of the well known solvents, can be precipitated as metallic ions of the metals, and be deposited from the solutions on negative cathodes of copper, mercury, zinc, etc., and recovered. It being also well known, that air simultaneously introduced in the solution, oxidizes the basic compounds present in the ore, and greatly assists in decomposing the bases, and altering their chemical composition, thereby allowing the solvents to exert the maximum efficiency in dissolving the precious metals. I am not claiming any rights with respect to these well known electrical and chemical reactions, but what is new, is the apparatus, in which these reactions are performed, and the mechanical manner in which the apparatus is manipulated, to produce new and important results in the saving of gold, silver and other metals and the compounds of these metals; enormous amounts of which are lost under the present methods of operation.

The process herein described but not claimed forms the subject-matter of another application Serial No. 44,684, filed August 10, 1915.

Having described my invention what I claim as new and desire to secure by Letters Patent is:

1. The combination with a tank, of a copper lining and bottom in the same, a coating of mercury on the lining and bottom, a shaft in the tank, electric conductive blades projecting from said shaft, means for rotating the shaft, an anode wire connected with the blades, a cathode wire connected with the copper lining and bottom, and a series of outlet holes extending from a point a short distance from the bottom to near the top of the tank and separate means for opening and closing each hole, substantially as set forth.

2. The combination with a tank having a series of apertures in its side, at different elevations, of a series of blades, each having a horizontal portion and a downwardly inclined portion, the horizontal portion being substantially in the same plane with the bottom edge of the outlet opening nearest said blade, substantially as set forth.

3. The combination with a tank, having a series of outlet openings in its side, at different elevations, of a series of blades mounted to rotate in a horizontal plane within the tank, each blade being provided on the underside with a metallic anode and the highest surface of each blade being substantially in the same plane with the bottom edge of the adjacent outlet opening and a cathode in the tank, substantially as set forth.

4. The combination with a vertical tank having a series of outlet openings in the side disposed at different elevations, a series of horizontal blades rotating in the tank, metal anode plates disseminated throughout the tank from top to bottom and disposed in various horizontal planes and an electric conductor connected with the various anodes and a cathode in the tank, substantially as set forth.

5. The combination with a tank provided with a series of outlet apertures in its side, the outlet apertures being disposed at various elevations, of a vertical shaft, a series of horizontal blades secured on said shaft at different elevations, there being one set of horizontally disposed blades between each two outlet openings and each of said blades being provided with an anode plate and a cathode in the tank, substantially as set forth.

6. The combination with a tank having outlet apertures, in its side, at different elevations, of a shaft, a series of horizontally disposed blades on said shaft, each blade being composed of a horizontal portion, a downwardly inclined portion along one edge of said horizontal portion and a horizontal portion extending from the lower edge of the inclined portion, and a correspondingly shaped anode plate secured to said blades and a cathode in the tank, substantially as set forth.

7. The combination with a tank having outlet apertures in its side, at various elevations, of a series of horizontally disposed blades, a shaft to which said blades are secured, at different elevations, an anode plate on each blade, an electrical conductor with which the anode plates are connected, a copper cathode plate on the bottom of the tank, an electrical conductor with which the cathode plate is connected, substantially as set forth.

8. The combination with a tank having outlet openings disposed at various elevations from the bottom and separate closures for said openings, of means for producing in a solution containing solids, in the tank, various horizontally disposed strata at different elevations and a series of anode blades distributed throughout the tank, and cathodes, substantially as set forth.

9. The combination with a tank having a series of outlet openings at different elevations from the bottom and separate closures for such openings, of means for producing in a solvent solution and solids contained therein, within said tank, horizontal strata disposed at various elevations and individual means for delivering an electric current into each stratum, substantially as set forth.

Signed at New York city, borough of Manhattan, in the county of New York and State of New York, this 20th day of July, A. D. 1915.

EDWARD R. HOLDEN.

Witnesses:
 THEO. H. J. SLINTER,
 J. E. HARRINGTON.